Dec. 15, 1936. H. L. PIKE 2,064,563
AUTOMATIC CLUTCH CONTROL
Original Filed March 30, 1931

Henry Loyd Pike
INVENTOR

BY Victor J. Evans
and Co.
ATTORNEYS

WITNESS:

Patented Dec. 15, 1936

2,064,563

UNITED STATES PATENT OFFICE 2,064,563

AUTOMATIC CLUTCH CONTROL

Henry Loyd Pike, Greensboro, N. C., assignor, by direct and mesne assignments, to Bragg-Kliesrath Corporation, South Bend, Ind., a corporation of New York Application March 30, 1931, Serial No. 526,378
Renewed February 9, 1934

5 Claims. (Cl. 192—.01)

This invention relates to automatic clutch controls and has for the primary object, the provision of a vacuum means to engage and maintain a clutch in the stated position with means to automatically disengage the clutch when the vacuum is broken at the will of the operator.

Another object of this invention is the provision of a device of the above stated character which may be easily and quickly attached to a conventional type of clutch and which will reduce manual operation of the clutch to a minimum thereby providing a device especially adaptable for clutches employed for many purposes and particularly for use on motor vehicles, whereby the feet and legs of the operator are left free to actuate the brake of the vehicle with one foot and to control the speed of the engine with the other foot and said last named control being actuated in such a way as to actuate the vacuum control means allowing the operator to always keep one foot on the brake pedal and the other foot on the accelerator of the engine thereby giving the operator perfect control of the vehicle.

A further object of this invention is the provision of an automatic clutch control of the above stated character which will be simple, durable and efficient and which may be manufactured and sold at a comparatively low cost.

With these and other objects in view, this invention consists in certain novel features of construction, combination and arrangement of parts to be hereinafter more fully described and claimed.

For a complete understanding of my invention, reference is to be had to the following description and accompanying drawing, in which—

Figure 1:
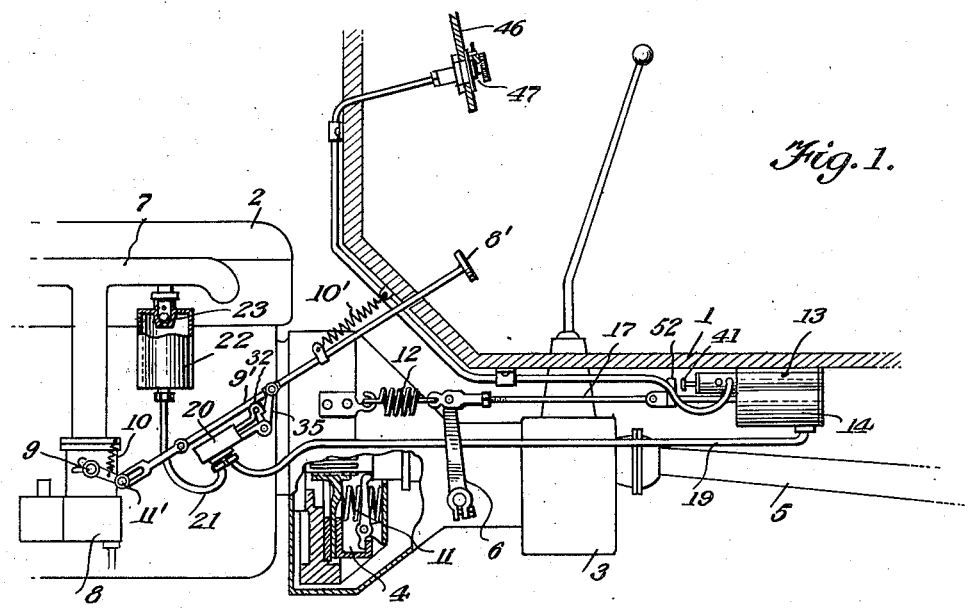
Figure 1 is a fragmentary side elevation partly in section of a motor vehicle, illustrating the engine, clutch and transmission associated with the usual propeller shaft.
Figure 2:
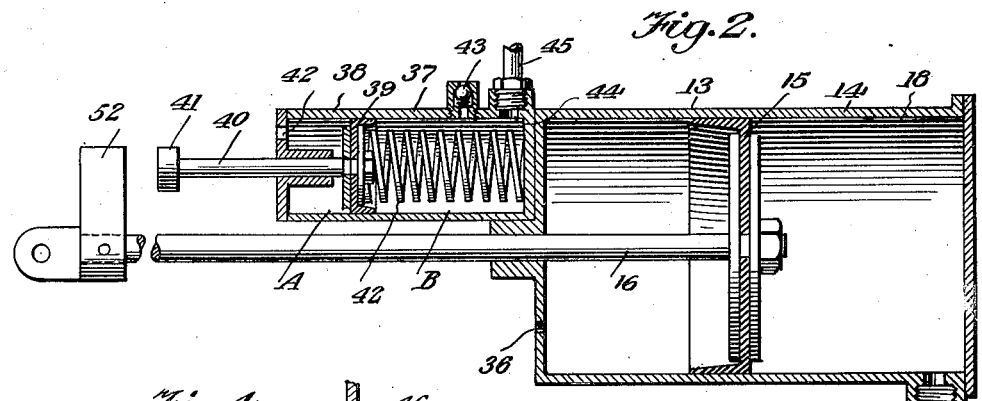
Figure 2 is an enlarged sectional view illustrating a vacuum control means for the clutch.
Figure 4:
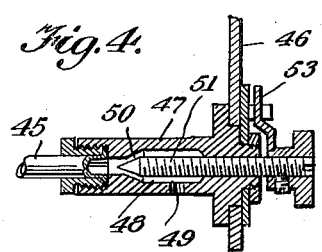
Figure 4 is a fragmentary sectional view illustrating a control valve for the cushioning means of the piston employed for actuation of the clutch.
Figure 5:
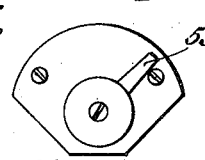
Figure 5 is a detail front elevation illustrating the same.

My invention is adaptable to clutches employed for many purposes and to give a clear understanding of the construction and operation of my invention I have elected to show the same associated with a motor vehicle, however, under the scope of the claims I do not desire to be limited to this particular application of my invention to a motor vehicle.

Referring in detail to the drawing, the numeral 1 indicates a fragmentary portion of a motor vehicle body having associated therewith an internal combustion engine 2 connected to a transmission 3 by a clutch 4. The transmission having the usual propeller shaft 5 associated therewith and the clutch engaged and disengaged by movement of the arm 6. The engine 2 is provided with the usual intake manifold 7 connected to a carburetor 8 having a control valve 9, so adjusted that the engine will be kept running at an idling speed when said valve is in an off position. A spring 10 is connected to the valve for normally urging the latter into the stated position. The valve 9 is moved toward an open position by a person pressing upon the usual accelerator pedal 8' which forms part of a rod 9' normally urged upwardly by a spring 10'. The rod 9' includes pivotally connected sections and one section is connected to the valve arm of the valve 9 by a pin and slot connection 11', so that on a downward movement of the accelerator pedal the valve will be moved to an open position against the tension of the spring 10.

The clutch 4 is of a conventional type employing a spring 11 to normally urge the clutch elements of the clutch in engagement with each other and to interrupt the driving action between the engine and transmission, the clutch arm 6 must be moved in one direction to disengage the clutch elements. The foregoing description relates to a well known construction of motor vehicles and to which my invention is applied.

A coil spring 12 is secured to the clutch housing and to the arm 6 and is of sufficient strength to overcome the action of the spring 11 for automatically disengaging the clutch elements of the clutch. A vacuum device 13 is employed for engaging the clutch elements against the action of the spring 12 and includes a cylinder 14 mounted on the body 1 of the vehicle and has slidably mounted therein a piston 15 provided with a stem 16 extending outwardly through one end of the cylinder and pivoted to a connecting link 17 which is in turn pivoted to the arm 6 of the clutch. The cylinder 14 between one end wall thereof and the piston 15 forms a vacuum chamber 18 having in communication therewith a pipe 19 connected to a control valve 20 located adjacent the engine 2 and the accelerator rod 9' as clearly shown in Figure 1. The control valve is also connected to a vacuum pipe 21 connected to a vacuum chamber 22. The chamber 22 is connected to the intake manifold 7 of the engine 2 and is provided with a check valve 23 which will permit the operation of the engine to create a vacuum within the chamber but will prevent a destruction of the vacuum when the engine is idle. The vacuum chamber 22 maintains a vacuum therein either when the engine is running or when idle and is capable of providing the necessary vacuum for the operation of the vacuum control 18 even when the engine is operating under full capacity at a slow rate of speed.

The control valve 20 includes a casing 24 having ports 25, 26 and 27 and the latter named port is opened to the atmosphere while the port 26 is connected to the pipe 19 and the pipe 21 is connected to the port 25. A slide valve 28 is mounted in the casing for controlling the ports and is provided with a passage 29 adapted to be brought in communication with either the ports 26 and 27 or with the ports 25 and 26. When the passage 29 is in communication with the ports 26 and 27, the vacuum chamber 18 of the cylinder 14 is under atmospheric pressure and when the passage 29 communicates with the ports 25 and 26, the vacuum chamber 18 of the cylinder 14 is in direct communication with the vacuum chamber 22 connected to the intake manifold of the engine. The slide valve 28 is tensioned by a spring 30 so as to establish a leak-proof connection between the valve member and its casing. An operating rod 31 is located on the slide valve and provided with a hook shaped end 32 adapted to be engaged and disengaged by a crank arm 33 journalled on a support 34 carried by the engine 2 or any other suitable place upon the vehicle. An operating arm 35 forms a part of the crank arm 33 and is pivotally connected to the accelerator rod 9' for the purpose of actuating the valve member 28 by the movement of the accelerator rod 9'.

Figure 3:
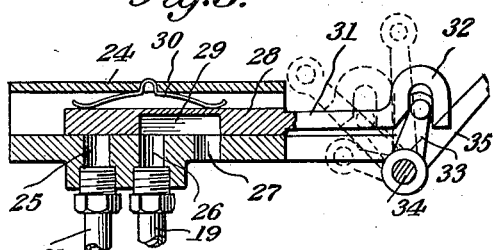
Figure 3 is a detail sectional view illustrating a control valve.

As shown in dotted lines in Figure 3 the crank arm 33 becomes disengaged from the hook-shaped end 32 of the rod 31 when the accelerator pedal 8' has been depressed a distance to cause a rapid speed of the engine and during this position the passage 29 of the valve member is in registration with the ports 25 and 26, establishing communication between the vacuum chamber 2 and the vacuum chamber 18 of the cylinder 14 causing a partial vacuum to be created in the chamber 18 and due to the opposite face of the piston 15 being under atmospheric pressure through the vent 36, the piston will move to engage the clutch elements of the clutch and maintain said elements in the stated position. When the accelerator pedal 8' is manually released it returns upwardly due to the influence of the spring 10' allowing the valve 9 of the carburetor to assume an off position for the engine to run at an idling speed and with the engine running at an idling speed, the valve member 28 is positioned so that the passage 29 communicates with the ports 26 and 27 destroying the partial vacuum in the chamber 18 of the cylinder 14 permitting the spring 12 to automatically disengage the clutch elements of the clutch and break the driving connection between the engine and the transmission.

A cushioning means 37 is provided for the piston 15 to retard the movement of the latter when influenced by the partial vacuum in the chamber 18 consequently preventing a too sudden movement of the piston in the stated direction for causing the engagement of the clutch and consequently permitting the clutch elements to engage gradually and smoothly. The cushioning means 37 includes an auxiliary cylinder 38 carried by the cylinder 14 and having slidably mounted therein a piston 39 provided with a stem 40 extending through one end of the cylinder and having a head 41 on the end thereof. Said last named end of the auxiliary cylinder is provided with a vent opening 42 placing one side of the piston 39 under atmospheric pressure while the opposite side of the piston is engaged by an expansion spring 42 normally urging said piston in one direction. The auxiliary cylinder 38 is divided into chambers A and B by the piston 39 and the chamber A is under atmospheric pressure by the vent 42 while the chamber B has a check valve 43 for the purpose of admitting air to the chamber B when the piston 39 is moved in one direction by the action of the spring but will close the chamber B to the atmosphere when the piston 39 is moved in a reverse direction against the action of the spring 42. A port 44 is in communication with the chamber B and has connected thereto a pipe 45 leading to the instrument board 46 of the body 1 and is connected to a control valve 47. The valve 47 has a suitable mounting with the dash board and is provided with a chamber 48 communicating with the atmosphere by a vent 49 and also to the pipe 45 through a valve seat 50. A needle valve 51 is associated with the valve seat 50 and has threaded connection with the casing of the valve 47 and is capable of adjustment relative to the seat for the purpose of controlling the flow of air of the chamber 3 to the atmosphere when the piston is moved against the action of the spring 42. An arm 52 is carried by the stem 16 of the piston 15 and during the movement of the piston under atmospheric pressure by creating a partial vacuum in the chamber 18 to engage the clutch elements of the clutch, the arm 52 engages the head 41 and moves the piston 39 against the action of the spring 42 and the flow of air outwardly from the chamber 13 being controlled by the valve 47, the movement of the piston 15 being retarded so as to cause a gradual and smooth engagement of the clutch elements.

Under certain driving conditions it is sometimes desired to have the clutch elements engage quicker than at other times and to permit of this operation, a finger piece 53 is secured to the valve stem 51 and by moving said finger piece in one direction, the valve stem 51 may be adjusted relative to the seat 50 for the purpose of permitting a more rapid escape of air from the chamber B.

In operation, with the engine running at idling speed, the operator depresses the accelerator pedal 8' slightly moving the valve member 28 to register the passage 29 thereof with the ports 25 and 26 which establishes communication between the vacuum chamber 22 and the chamber 18 of the cylinder 14. A partial vacuum is then established in the chamber 18 and the piston 15 then moves under atmospheric pressure to engage the clutch and due to the cushioning means 37, the clutch is engaged gradually to provide a smooth starting of the vehicle. With the parts as described, the clutch is engaged and the operator may drive the vehicle at any speed desired by his foot on the accelerator pedal 8'. When the operator releases the accelerator pedal 8', the spring 10 returns the pedal to its initial position which causes the valve member 28 to be moved to bring the passage 29 thereof in communication with the ports 26 and 27 breaking the vacuum in the chamber 18 of the cylinder and the spring 12 then automatically disengages the clutch stopping the driving action of the engine on the power shaft 5 through the transmission 3.

While I have shown and described the preferred embodiment of my invention, it will be understood that minor changes in construction, combination and arrangement of parts may be made without departing from the spirit and scope of my invention, as claimed.

Having thus described my invention, what I claim is:

1. In combination with an internal combustion engine controlled by an accelerator and having an intake manifold and a clutch between the engine and the transmission of a motor vehicle, a piston connected to the clutch, a cylinder receiving the piston having a vacuum chamber, a vacuum reservoir connected to the intake manifold, a control valve actuated by the movement of the accelerator and when in one position having communication with the atmosphere, pipes connecting the vacuum reservoir and the vacuum chamber of the cylinder with the valve to permit the engine when the valve is in one position to create a partial vacuum within the vacuum chamber for engaging the clutch and in another position to destroy said vacuum due to a certain movement of the accelerator for permitting the clutch to be disengaged, and means for disengaging the clutch when the vacuum is broken in the vacuum chamber of the cylinder.

2. In combination with an internal combustion engine controlled by an accelerator and having an intake manifold and a clutch between the engine and the transmission of a motor vehicle, a piston connected to the clutch, a cylinder receiving the piston having a vacuum chamber, a vacuum reservoir connected to the intake manifold, a check valve between the vacuum reservoir and the intake manifold to prevent destroying the vacuum therein when the engine is idling or operating at such a rate of speed as to not create a vacuum within said reservoir, a control valve actuated by the movement of the accelerator and when in one position having communication with the atmosphere, pipes connecting the vacuum reservoir and the vacuum chamber of the cylinder with the valve to permit the engine when the valve is in one position to create a partial vacuum within the chamber for engaging the clutch and in another position to destroy said vacuum due to a certain movement of the accelerator for permitting the clutch to be disengaged, and means for disengaging the clutch when the vacuum is broken in the vacuum chamber of the cylinder.

3. In combination with an internal combustion engine controlled by an accelerator and having an intake manifold and a clutch between the engine and the transmission of a motor vehicle, a vacuum means connected to the clutch for engaging the latter by a vacuum created by the engine, said means including fluid transmitting connections having incorporated therein a vacuum storage means, a control valve actuated by the movements of the accelerator and connected to the vacuum means whereby the clutch will be engaged by vacuum during certain speeds of rotation of the engine and the vacuum broken at an idling or slow speed of rotation of the engine, and means for automatically disengaging the clutch when the vacuum means is broken.

4. In combination with an internal combustion engine controlled by an accelerator and having an intake manifold and a clutch between the engine of a motor vehicle, a vacuum means connected to the intake manifold and to the clutch, a control valve connected to said vacuum means, an operating member on the valve and having a hook shaped end, a pivotally mounted arm connected to the accelerator and engageable with the hook shaped end of the operating member during a certain movement of the accelerator and adapted to be disengaged from the hook shaped end during other movements of the accelerator, and an automatic means for disengaging the clutch when the vacuum within the vacuum control means is broken.

5. In an automotive vehicle provided with a clutch, a throttle, an accelerator and a source of subatmospheric pressure, power means for operating the clutch comprising a pressure differential operated motor operably connected to the clutch, fluid transmitting connections interconnecting said subatmospheric source and power means, vacuum storage means incorporated in said connections, an accelerator operated valve means for controlling the operation of said motor to initiate the clutch engaging operation of the motor by connecting the same with said vacuum storage means.

HENRY LOYD PIKE.